United States Patent

Schwartz

[11] Patent Number: 5,989,036
[45] Date of Patent: Nov. 23, 1999

[54] DEVICE FOR ENCOURAGING THE BRUSHING OF TEETH

[76] Inventor: Erez Schwartz, 12 Haganim Street, 47231 Ramat Hasharon, Israel

[21] Appl. No.: 09/158,005

[22] Filed: Sep. 22, 1998

[51] Int. Cl.[6] .................................................. G09B 23/28
[52] U.S. Cl. .......................... 434/263; 434/262; 446/73
[58] Field of Search .......................... 434/263; 446/296, 446/230, 352, 353

[56] References Cited

U.S. PATENT DOCUMENTS

| | | | |
|---|---|---|---|
| 1,342,156 | 6/1920 | Brittain | 434/263 |
| 2,926,487 | 3/1960 | Stone | 434/263 |
| 3,998,234 | 12/1976 | Stubbmann | 434/263 |

Primary Examiner—Robert A. Hafer
Assistant Examiner—Bena B. Miller
Attorney, Agent, or Firm—Benjamin J. Barish

[57] ABSTRACT

A device for encouraging the brushing of teeth by a child includes a doll having a toothbrush carried by an arm of the doll adjacent the mouth of the doll; an electrical motor; a transmission coupling the electrical motor to the doll's toothbrush for reciprocating the doll's toothbrush with respect to the doll's mouth to simulate brushing teeth; and an electrical control circuit including an electrical switch to be actuated for energizing the electrical motor.

18 Claims, 5 Drawing Sheets

DEVICE FOR ENCOURAGING THE BRUSHING OF TEETH

FIELD AND BACKGROUND OF THE INVENTION

The present invention relates to a device, in the form of a doll, for encouraging the brushing of teeth by a child.

The value of dolls as educational devices is generally recognized, and dolls have been used for displaying or simulating to children a wide variety of human activities in order to educate them regarding such activities.

An object of the present invention is to provide a device for encouraging children regarding the brushing of teeth.

BRIEF SUMMARY OF THE INVENTION

According to a broad aspect of the present invention, there is provided a device for encouraging the brushing of teeth by a child, comprising: a doll having a toothbrush carried by an arm of the doll adjacent the mouth of the doll; an electrical motor; a transmission coupling the electrical motor to the doll's toothbrush for reciprocating the doll's toothbrush with respect to the doll's mouth to simulate brushing teeth; and an electrical control circuit including an electrical switch to be actuated for energizing the electrical motor.

According to additional features in the preferred embodiment of the invention described below, the doll further includes a holder for holding the child's toothbrush; the electrical switch being located with respect to the holder to be actuated when the toothbrush held in the holder is removed therefrom. In this embodiment, the electrical control circuit energizes the electrical motor for a predetermined time interval when the electrical switch is activated.

According to yet additional features in the described preferred embodiment, the device further includes a sound reproducer which is energized by the electrical control circuit when the electrical switch is actuated. In the described embodiment, the sound reproducer reproduces a pre-recorded song relating to the brushing of teeth.

According to still further features in the described preferred embodiment, the transmission reciprocates the doll's toothbrush for a predetermined number of times through a predetermined distance on one side of the doll's mouth, and then for a predetermined number of times through a predetermined distance on the other side of the doll's mouth. This pattern of reciprocations is produced by a unidirectional rotary motor and a transmission controlled by a solenoid.

Further features and advantages of the invention will be apparent from the description below.

BRIEF DESCRIPTION OF THE DRAWINGS

The invention is herein described, by way of example only, with reference to the accompanying drawings, wherein.

DETAILED DESCRIPTION OF THE PREFERRED EMBODIMENT

Figure 1:
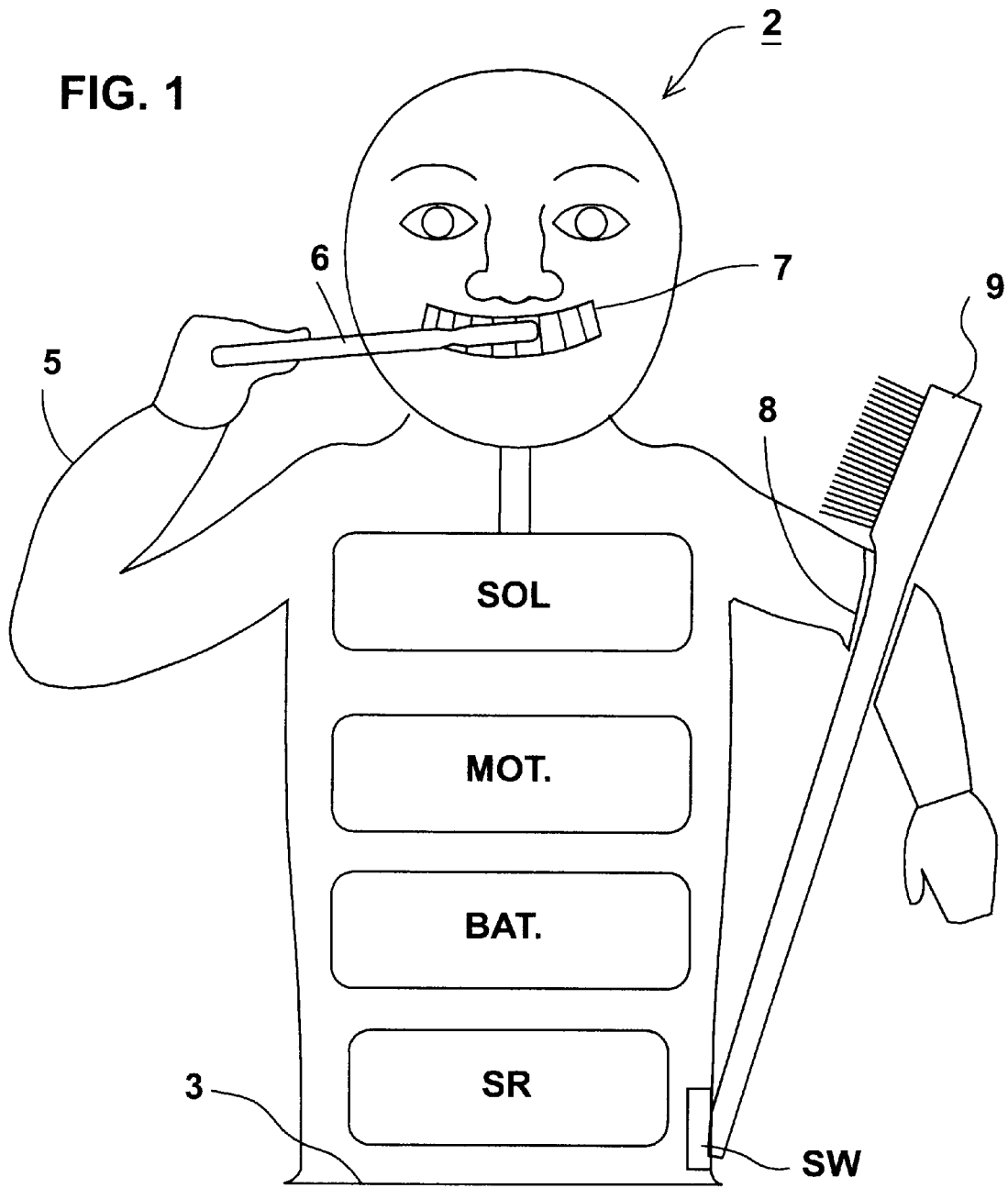
FIG. 1 illiustrates a doll constructed in accordance with a preferred embodiment of the present invention.
Figure 2:
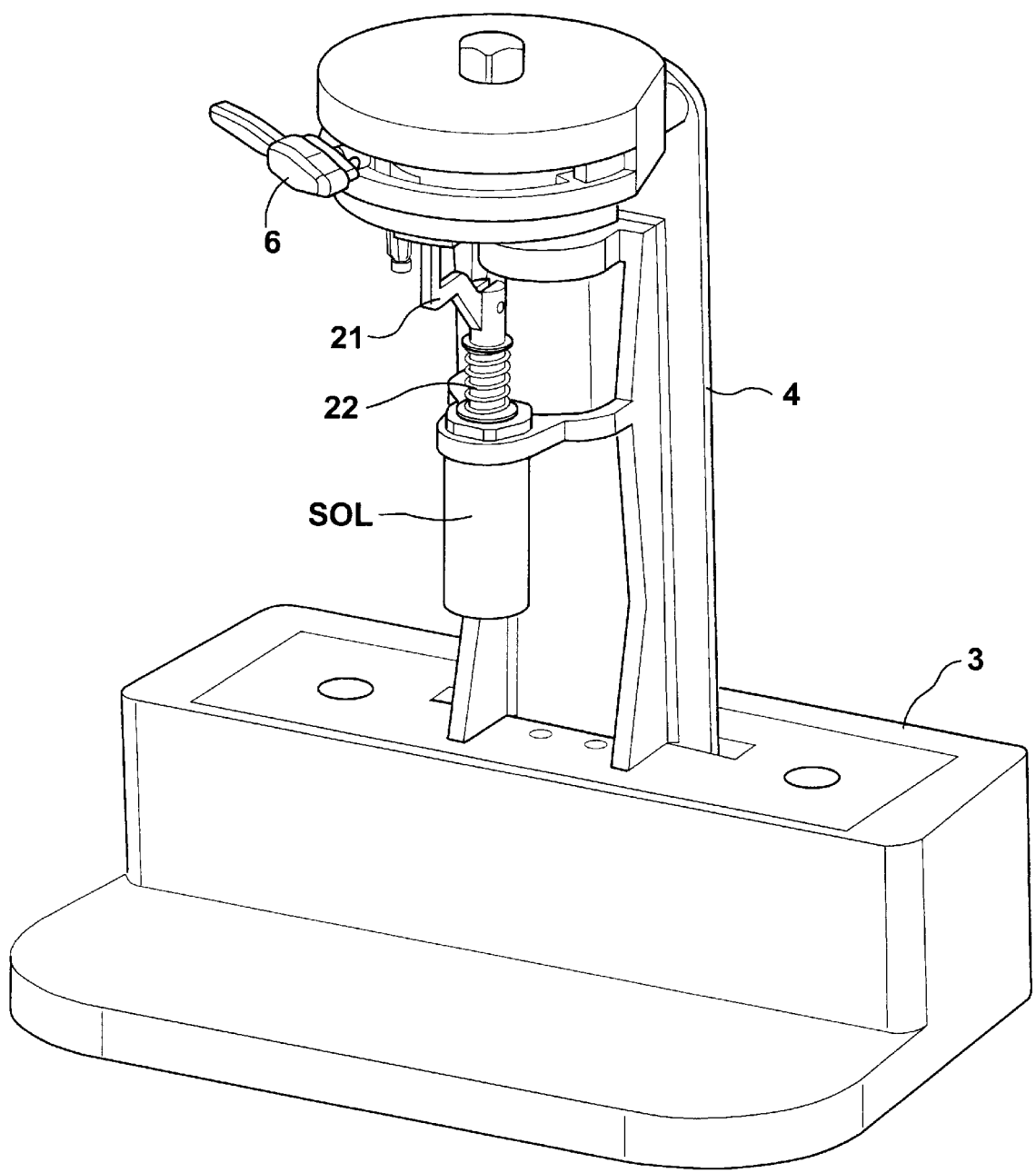
FIG. 2 is a perspective view, from the front, illustrating the drive and parts of the transmission for reciprocating the doll's arm, and the doll's toothbrush carried thereby, with respect to the doll's mouth to simulate brushing teeth.
Figure 3:
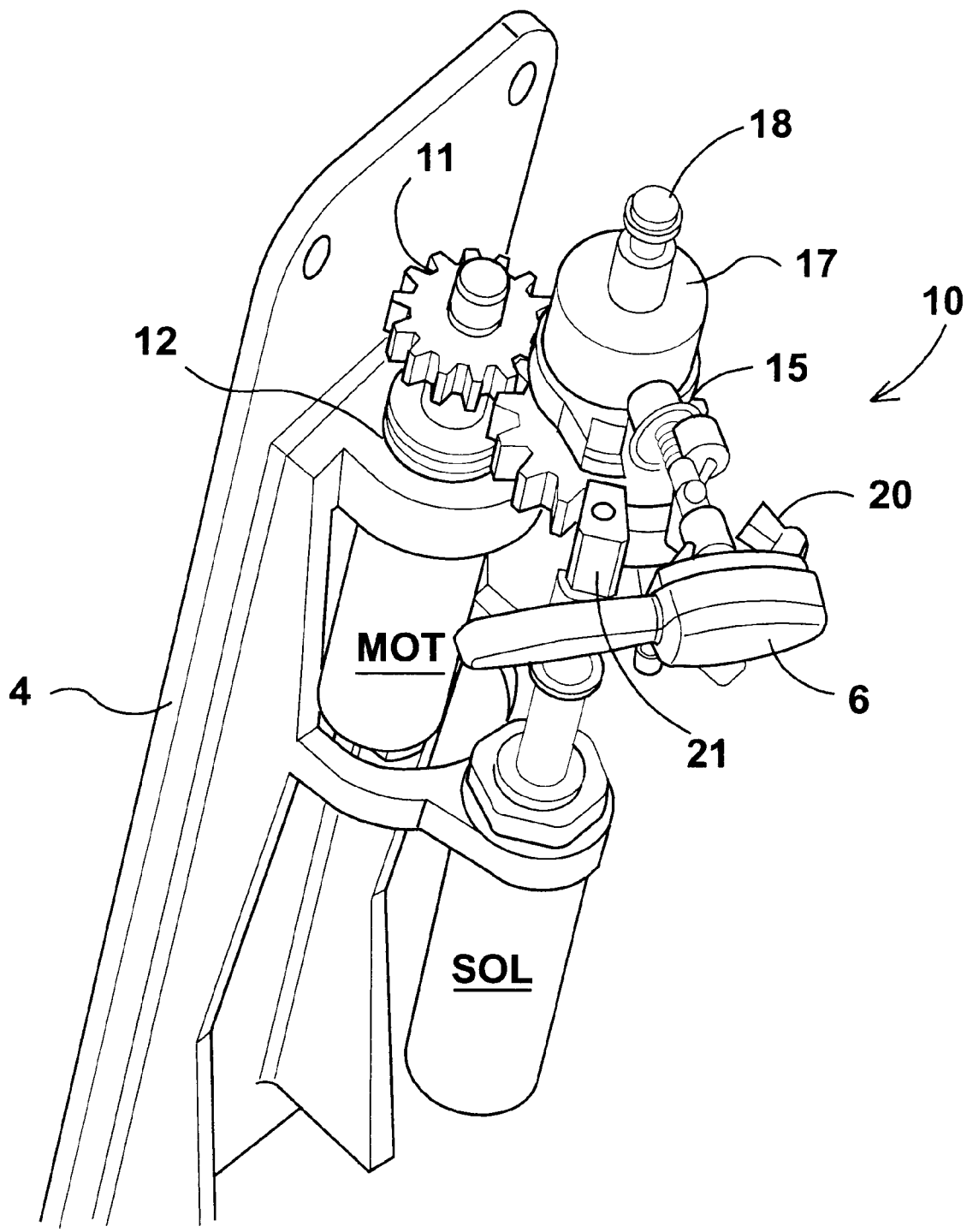
FIG. 3 is a perspective view, from the top, better illustrating certain components of the drive and transmission of FIG. 2.
Figure 4:
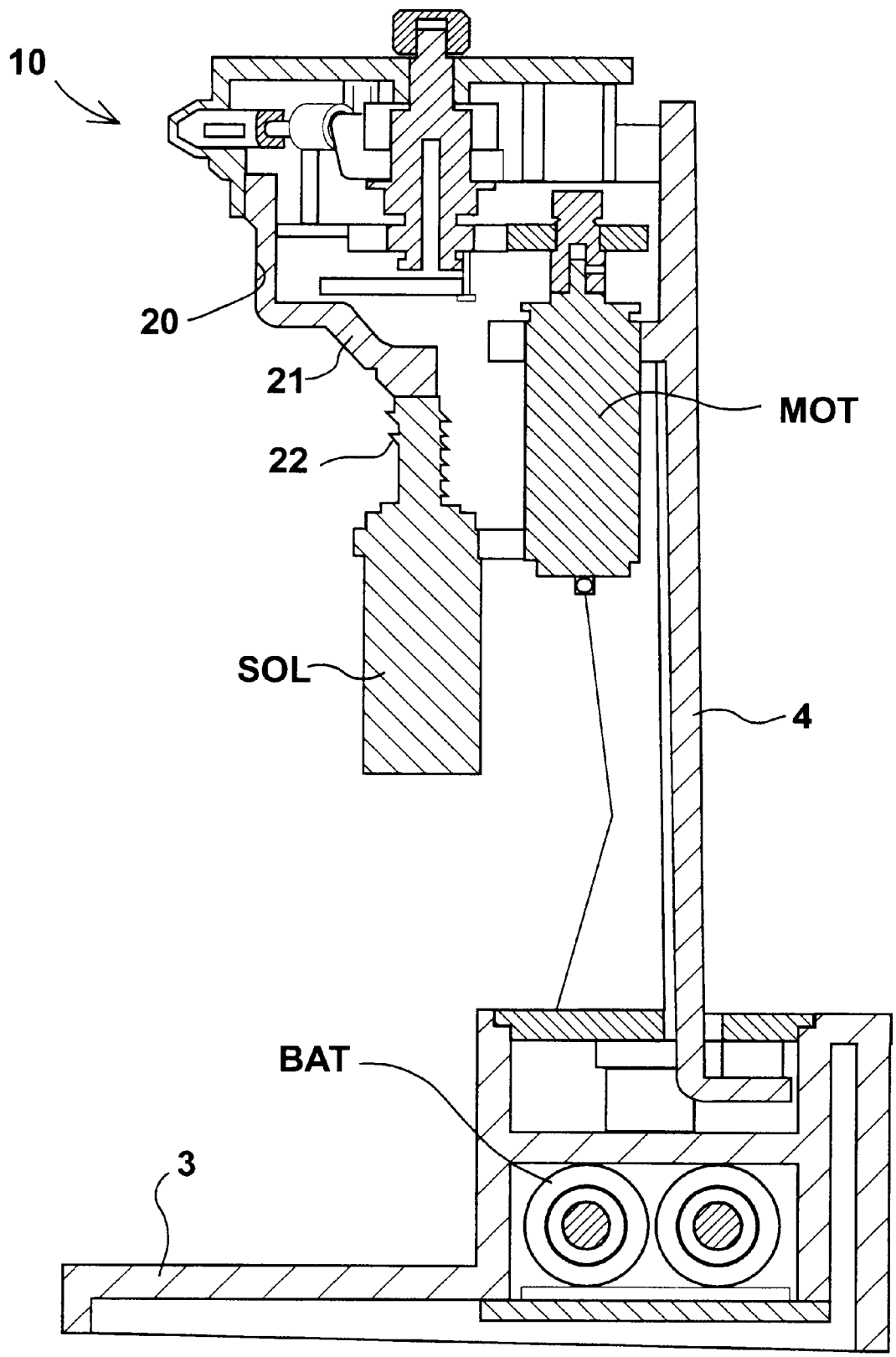
FIG. 4 is a sectional view illustrating the drive and transmission of FIG. 2.

The preferred embodiment of the invention described below is in the form of a doll, generally designated 2 in FIG. 1, mounted on a base 3 capable of supporting the doll on any flat horizontal surface and in a vertical position by a vertical frame member 4 (FIGS. 2–4). The doll 2 includes an arm 5 carrying a doll's toothbrush 6 which is reciprocated with respect to the doll's mouth 7 to simulate the brushing of teeth.

The doll 2 illustrated in FIG. 1 further includes a holder 8 for holding an actual toothbrush 9 to be used by the child when brushing his or her own teeth as encouraged by the movements of the doll 2 to be described below. The doll 2 further includes an electrical switch SW located with respect to the holder 8 so as to be actuated when the child's toothbrush 9 is removed from the holder.

Figure 6:
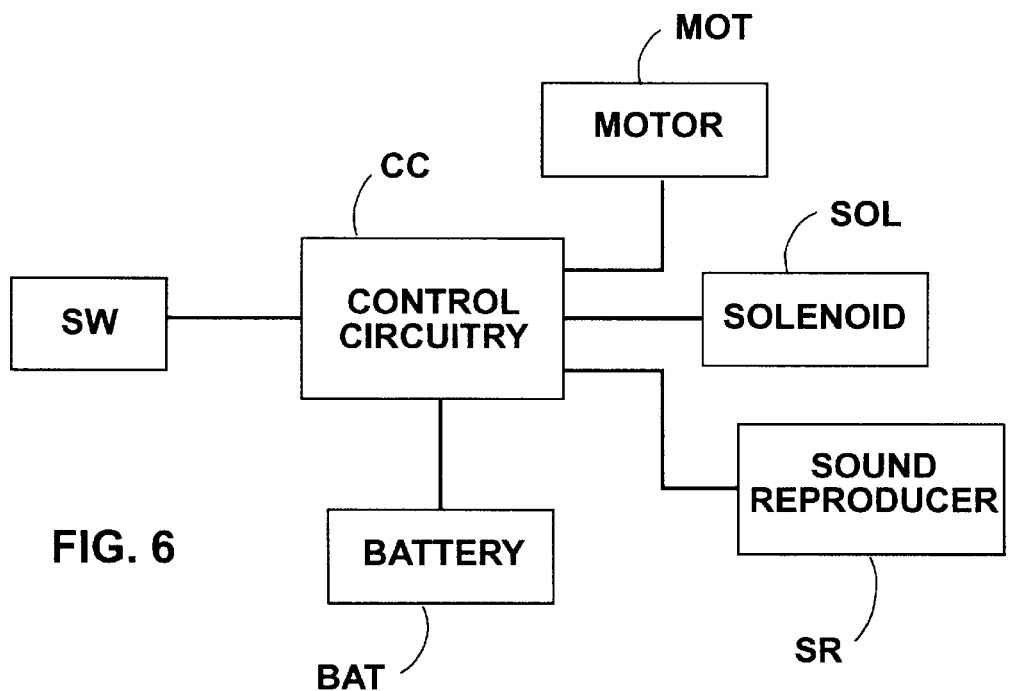
FIG. 6 is a block diagram illustrating the electrical control circuit of the device of FIGS. 1–5.

In addition to electrical switch SW, the illustrated doll includes a number of electrical components shown schematically in FIG. 6, namely: an electrical motor MOT supplied by a battery BAT, a solenoid SOL, and a sound reproducer SR. As will be described more particularly below, when electrical switch SW is actuated by the removal of the child's toothbrush 9 from its holder 8, electrical motor MOT is energized to reciprocate the doll's toothbrush 6 a number of reciprocations on one side of the doll's mouth 7, and then on the opposite side of the doll's mouth, to simulate brushing the teeth by the doll. These reciprocations are controlled by the solenoid SOL. In addition, the sound reproducer SR is energized to reproduce a pre-recorded song relating to the brushing of the teeth.

The simulation by the doll of brushing teeth, and the reproduction of a song relating to brushing of teeth, have been found to encourage the child to remove the child's toothbrush 9 and to use it for brushing his or her teeth.

FIGS. 2–5 more particularly illustrate the transmission, generally designated 10, coupling the electrical motor MOT to the doll's toothbrush 6 for reciprocating the doll's toothbrush 6 to simulate brushing teeth.

Figure 5:
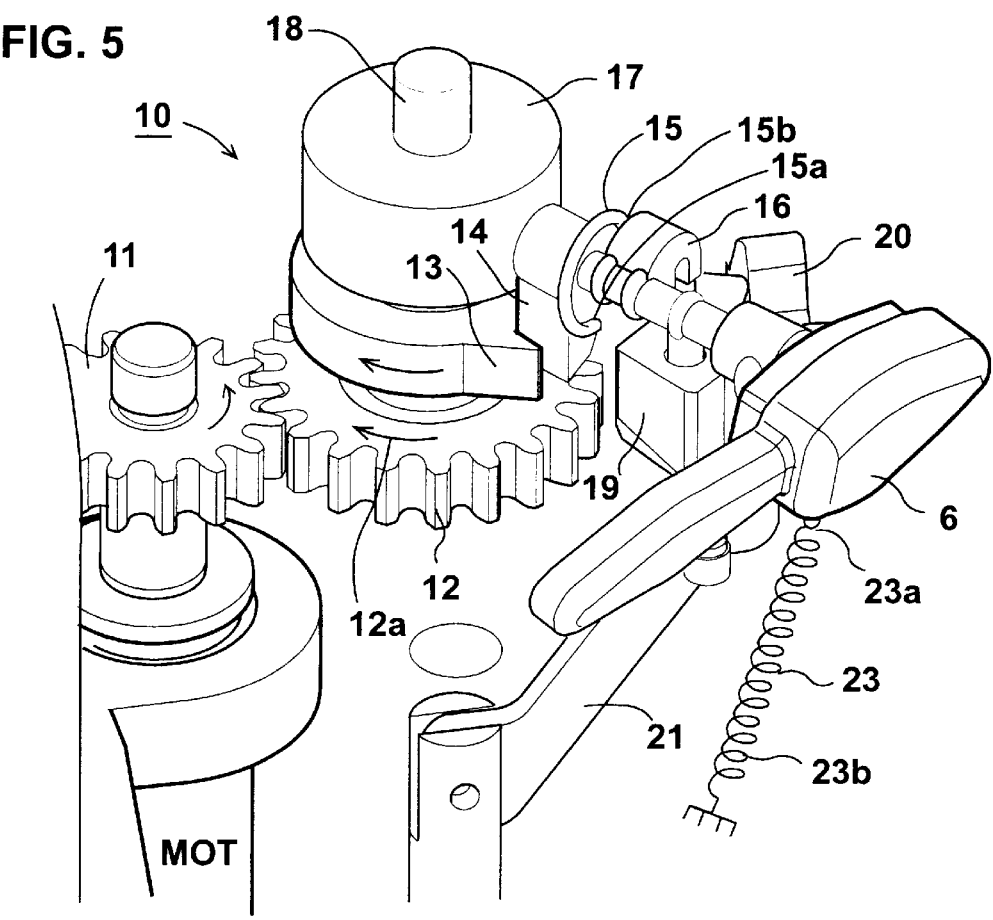
FIG. 5 is an enlarged perspective view better illustrating certain parts of the drive and transmission of FIGS. 2–4.

As shown particularly in FIG. 5, this transmission includes a gear 11 rotated by motor MOT and in turn rotating another gear 12 having a tooth 13 secured to its upper side. Tooth 13 serves as a driving member which drives another tooth 14, serving as a driven member coupled to the doll's toothbrush 6. The driven tooth 14 is coupled to the doll's toothbrush 6 by means of a yieldable coupling in the form of a spring 15 defining a coil having one end 15*a* fixed to the driven tooth 14, and the opposite end 15*b* fixed to a laterally-projecting element 16 carried by the doll's toothbrush 6.

The doll's toothbrush 6 is carried by a bearing 17 rotatably mounted on a shaft 18 coaxial with gear 12.

The doll's toothbrush 6 further carries a depending element 19 engageable with a limit stop 20 carried by an arm 21 movable by the solenoid SOL. Arm 21 of the solenoid SOL is urged to its raised position by spring 22, so that energization of the solenoid lowers its arm 21, and the limit stop 22 (e.g. FIGS. 2 and 4) carried thereby. Spring 20 returns the arm and limit stop to their normal raised conditions as soon as the energization of the solenoid is terminated.

As will be described more particularly below, the foregoing elements of the transmission 10 produce the forwards strokes of the reciprocatory movements of the doll's toothbrush to simulate the use of the doll's toothbrush to brush the doll's teeth. The return strokes of these reciprocatory movements are effected by a return spring 23 (FIG. 5) having one end 23a fixed to the doll's toothbrush 6 and the opposite end 23b fixed to a fixed element with respect to the doll.

The illustrated device operates as follows:

Normally the various parts of the doll 2 are in the position illustrated in FIG. 1, with the child's toothbrush 9, to be used by the child, within holder 8 of the doll and engaging switch SW so that the switch is normally open. As soon as the child's toothbrush 9 is removed from the doll's holder 8, switch SW is closed. This actuates control circuit CC (FIG. 6) to initiate the following cycle of operation with respect to motor MOT, solenoid SOL, and sound reproducer SR.

As soon as switch SW is closed, control circuit CC energizes motor MOT for a predetermined time interval, e.g., one minute. The energization of motor MOT rotates its gears 11, 12, in the direction of the respective arrows 11a, 12a (FIG. 5), to drive tooth 13 clockwise towards the driven tooth 14. When the driving tooth 13 engages the driven tooth 14, the spring coupling 15 between the driven tooth 14 and the doll's arm 5 drives the doll's toothbrush 6 in the direction of movement of the driving tooth 13 until the depending element 19 on the doll's toothbrush engages limit stop 20 carried by the solenoid arm 21. When this occurs, limit stop 20 blocks further movement of the doll's toothbrush in that direction, but spring 15 yields to permit the driving element 13 to continue moving (counter-clockwise).

This completes the forward stroke of the doll's toothbrush 6. The return stroke of this reciprocatory movement is effected by return spring 23, which moves the doll's toothbrush 6 in the reverse direction, as soon as the driving tooth 13 has cleared the driven tooth 14.

The foregoing reciprocations of the doll's toothbrush 6 are repeated with each rotation of the driving tooth 13 by the electrical motor MOT so long as the limit stop 20 is in its normal, raised position as illustrated in FIG. 5.

After a predetermined time interval, e.g., 30 seconds after switch SW has been actuated, the control circuit CC momentarily enegrizes solenoid SOL to momentarily lower the limit stop 20 out of the path of movement of the depending element, such that the doll's toothbrush 6 is not blocked from movement in the same direction as the driving tooth 13, but rather continues its movement in that direction. In this manner, and the doll's toothbrush 6 is now moved to another side of the doll's mouth 7, whereupon solenoid SO1 is deenergized to permit the limit stop 20 to return to its normal raised position blocking the movement of the doll's toothbrush. Thus, the continued rotation of motor MOT in the same direction, will now move the doll's toothbrush 6 through forward strokes at this side of the doll's mouth, with each forward stroke being followed by the return stroke effected by the return spring 23, in the same manner as described above. These reciprocations of the doll's toothbrush continue for the remainder of the cycle of energization of the motor MOT.

It will thus be seen that, when the child's toothbrush 9 is removed from the doll holder 8, switch SW is actuated to energize motor MOT for one minute. At the start, limit stop 18 is in its raised position, thereby producing a plurality of reciprocations of the doll's toothbrush 6 at one side of the doll's mouth. After one-half minute, solenoid SOL is momentarily energized to momentarily lower limit stop 20, to thereby permit the doll's toothbrush 6 to continue to the other side of the doll's mouth, whereupon the limit stop 20 returns to its normal raised position to thereby produce a plurality of reciprocations of the doll's toothbrush 6 at that side of the doll's mouth.

The actuation of switch SW by the removal of the child's toothbrush 9 also energizes the sound reproducer SR (FIG. 6), which reproduces a pre-recorded song relating to the brushing of teeth. The reproduction of the song may continue for the full one-minute cycle of operation of the doll, or even longer, to encourage the child to use the child's toothbrush 9 removed from the holder 8 for brushing his or her teeth.

While the invention has been described with respect to one preferred embodiment, it will be appreciated that this is set forth merely for purposes of example, and that many variations and modifications may be made. For example, instead of switch SW being automatically actuated by the removal of the child's toothbrush 9, such a switch could be manually actuated, e.g., by depressing a button. Also, instead of simulating the doll brushing the teeth by horizontal reciprocations first on one side of the doll's mouth and then on the opposite side, other brushing patterns could be used, e.g., up-and-down reciprocations rather than horizontal reciprocations, or only one group of reciprocations for the mouth as a whole, rather than two groups of reciprocations for different sides of the doll's mouth.

Many other variations, modifications and applications of the invention will be apparent.

What is claimed is:

1. A device for encouraging the brushing of teeth by a child, comprising:

a doll having a toothbrush carried by an arm of the doll adjacent the mouth of the doll;

an electrical motor;

a transmission coupling the electrical motor to the doll's toothbrush for reciprocating the doll's toothbrush with respect to the doll's mouth to simulate brushing teeth, said transmission reciprocating the doll's toothbrush a predetermined number of times through a predetermined distance on one side of the doll's mouth, and then a predetermined number of times through a predetermined distance on the other side of the doll's mouth;

and an electrical control circuit including an electrical switch to be actuated for energizing said electrical motor.

2. The device according to claim 1, wherein said doll further includes a holder for holding the child's toothbrush; said electrical switch being located with respect to said holder to be actuated when the toothbrush held in said holder is removed therefrom.

3. The device according to claim 1, wherein said electrical control circuit energizes said electrical motor for a predetermined time interval when said electrical switch is actuated.

4. The device according to claim 1, wherein said device further includes a sound reproducer which is energized by said electrical control circuit when the electrical switch is actuated.

5. The device according to claim 4, wherein said sound reproducer reproduces a pre-recorded song relating to the brushing of teeth.

6. The device according to claim 1, wherein said transmission includes:

a driving member coupled to the electrical motor so as to be rotated thereby;

a driven member coupled to the doll's toothbrush and driven by the driving member in a first direction during the rotation of the driving member;

a limit stop engageable by the driven member to block movement in said first direction of the driven member and the doll's toothbrush;

said driven member being coupled to said doll's toothbrush by a yieldable coupling which permits continued movement of the driving member when movement of the driven member is blocked by said limit stop;

and a return drive for driving the doll's toothbrush, in the return direction opposite to said first direction.

7. The device according to claim 6, wherein said return drive is a return spring connected at one end to the doll's toothbrush, and at the opposite end to a fixed element on the doll.

8. The device according to claim 7, wherein said limit stop is momentarily movable from a blocking position to an unblocking position, and then returns to its blocking position, such that said limit stop:

(a) when in its blocking position, effects reciprocations of the doll's toothbrush with respect to one side of the doll's mouth;

(b) when momentarily in its unblocking position, permits the doll's toothbrush to continue moving in said first direction to another side of the doll's mouth; and (c) when returned to its blocking position, effects reciprocations of the doll's toothbrush with respect to said another side of the doll's mouth.

9. The device according to claim 8, wherein said limit stop is movable from its blocking position to its unblocking position, and then back to its blocking position, by a solenoid.

10. The device according to claim 9, wherein said electrical control circuit controls said electrical motor and said solenoid to effect, when the electrical switch is actuated, a plurality of reciprocations of the doll's toothbrush for about one-half minute on one side of the doll's mouth, and then a plurality of reciprocations of the doll's toothbrush for about another one-half minute on said another side of the doll's mouth.

11. The device according to claim 10, wherein said doll further includes a holder for holding the child's toothbrush; said electrical switch being located with respect to said holder to be actuated when the toothbrush held in said holder is removed therefrom.

12. The device according to claim 6, wherein said yieldable coupling comprises a spring having one end fixed to the driven member and the opposite end fixed to the doll's toothbrush.

13. The device according to claim 12, wherein said spring includes a coil circumscribing the coupling to said doll's toothbrush.

14. The device according to claim 6, wherein said driving element is a first tooth carried by a gear rotated by said electrical motor, and said driven element is a second tooth in the path of said first tooth and coupled by said yieldable coupling to the doll's toothbrush.

15. A device for encouraging the brushing of teeth by a child, comprising:

a doll having a toothbrush carried by an arm of the doll adjacent the mouth of the doll;

an electrical motor;

a transmission coupling the electrical motor to the doll's toothbrush for reciprocating the doll's toothbrush with respect to the doll's mouth to simulate brushing teeth, said transmission reciprocates the doll's toothbrush a predetermined number of times through a predetermined distance on one side of the doll's mouth, and then a predetermined number of times through a predetermined distance on the other side of the doll's mouth;

a holder for holding the child's toothbrush;

a sound reproducer;

and an electrical control circuit including an electrical switch located with respect to said holder to be actuated when the toothbrush held in said holder is removed therefrom, the actuation of said electrical switch energizing said electrical motor and said sound reproducer for a predetermined time interval.

16. The device according to claim 15, wherein said transmission includes:

a driving member coupled to the electrical motor so as to be rotated thereby;

a driven member coupled to the doll's toothbrush and driven by the driving member in a first direction during the rotation of the driving member;

a limit stop engageable by the driven member to block movement in said first direction of the driven member, the doll's toothbrush;

said driven member being coupled to said doll's toothbrush by a yieldable coupling which permits continued movement of the driving member when movement of the driven member is blocked by said limit stop;

and a return spring for driving the doll's toothbrush in the return direction.

17. The device according to claim 16, wherein said limit stop is momentarily movable by a solenoid from a blocking position to an unblocking position, and then returns to its blocking position, such that said limit stop:

(a) when in its blocking position, effects reciprocations of the doll's toothbrush with respect to one side of the doll's mouth;

(b) when momentarily in its unblocking position, permits the doll's toothbrush to continue moving in said first direction to another side of the doll's mouth; and (c) when returned to its blocking position, effects reciprocations of the doll's toothbrush with respect to said another side of the doll's mouth.

18. The device according to claim 17, wherein said electrical control circuit controls said electrical motor and said solenoid to effect, when the electrical switch is actuated, a plurality of reciprocations of the doll's toothbrush for about one-half minute on one side of the doll's mouth, and then a plurality of reciprocations of the doll's toothbrush for about another one-half minute on said another side of the doll's mouth.

* * * * *